United States Patent [19]
Goodman

[11] Patent Number: 5,135,161
[45] Date of Patent: Aug. 4, 1992

[54] REDUCED NOISE TRIM AIR SYSTEM

[75] Inventor: Robert B. Goodman, West Hartford, Conn.

[73] Assignee: United Technologies Corporation, Hartford, Conn.

[21] Appl. No.: 625,187

[22] Filed: Dec. 10, 1990

[51] Int. Cl.[5] .......................................... G05D 23/13
[52] U.S. Cl. ...................................... 236/13; 137/118; 454/74; 454/262
[58] Field of Search ................ 98/1.5; 236/13, 49.3; 137/118, 487.5, 861, 862

[56] References Cited

U.S. PATENT DOCUMENTS

| | | | |
|---|---|---|---|
| 2,412,071 | 12/1946 | Warner et al. | 98/1.5 |
| 2,923,222 | 2/1960 | Manning et al. | 236/13 X |
| 2,925,255 | 2/1960 | Shaw | 236/13 X |
| 2,931,574 | 4/1960 | Zuiderhoek | 236/13 X |
| 3,045,983 | 7/1962 | Best | 98/1.5 X |
| 3,089,649 | 5/1963 | Curran | 236/13 X |
| 4,445,342 | 5/1984 | Warner | 236/13 X |
| 4,773,307 | 9/1988 | Goodman | 98/1.5 |

*Primary Examiner*—William E. Tapolcai
*Attorney, Agent, or Firm*—Patrick J. O'Shea

[57] ABSTRACT

Audio noise created by trim valves (66a–72a) in a warm air trim system (24) of an air cycle air conditioning system (10) is reduced by controlling the pressure drop across the trim valves as a function of the position of the valves (66a–72a). A proportional valve (112) typically under the control of an electronic controller (116) is controlled to set the pressure drop across the trim valves. Reducing the pressure drop across the trim valves, reduces the noise created by air flowing through the trim valves thereby reducing noise in an aircraft cabin.

10 Claims, 7 Drawing Sheets

REDUCED NOISE TRIM AIR SYSTEM

DESCRIPTION

1. Technical Field

This invention relates to environmental control systems for aircraft, and more particularly to such systems which reduce the audio noise generated by temperature control trim valves due to the flow of air through the trim valves.

2. Background

In most commercial and military aircraft an air cycle air conditioning system is used to cool the aircraft cabin, cockpit and equipment compartments such as the avionics bay. The air cycle air conditioning system is typically driven by pressurized air either bled off the compressor stage of the aircraft gas turbine engine or from an auxiliary power unit (APU).

U.S. Pat. No. 4,445,342 to Warner and assigned to the assignee of the present invention illustrates a modern air cycle air conditioning system driven by pressurized compressor bleed. In general the pressurized air is cooled by a primary heat exchanger, and then input to a compressor to increase the pressure of the air. The air from the compressor is input to a secondary heat exchanger which cools the compressed air prior to entering a turbine. The air provided to the turbine performs work on the turbine in the well known manner, causing an expansion and cooling of the air. The cool exhaust air is then used to control the temperature and pressure of the air in the aircraft with a warm air trim added as necessary.

In an aircraft with multiple zones, the actual temperature within each zone will vary. As an example in an aircraft with three passenger zones and a zone dedicated to the cockpit, there are four different actual temperatures being sensed.

To account for variations in the temperature of each zone, a trim valve is dedicated to each zone for trimming (i.e., mixing) the cool conditioned air with hot air to create a combined air flow at the correct temperature for each particular zone. The control logic in the system determines which zone requires the coolest air and uses the requirement from that particular zone to set the reference temperature the cool conditioned air will be provided at. The other zones will use their associated trim valve to mix hot air in with this cooled air to create their own combined air flow at the proper temperature for entry into their respective zones.

One problem associated with this method is the magnitude of the audio noise generated by the air rushing through the trim valve for each zone. As in the '342 patent to Warner, a regulating valve provides an air flow to a manifold which provides an air flow to a parallel network of trim valves associated with each of the aircraft zones. The regulating valve controls the flow through itself in order to maintain the pressure drop across the trim valves equal to a constant pressure value (e.g., 9.5 psi). The constant pressure value is selected to ensure the trim valves can provide the necessary mass flow of air under worst case system demand.

The worst case system demand may occur when the cockpit zone is asking for cooled air since the temperature in the cockpit is above a reference value; while the cabin zones are all well below their reference value creating a need for warmer air to be introduced into each cabin zone. The need for warmer air may cause all the cabin trim valves to go full open, mixing the maximum amount of hot air with the cooled air. The cockpit will usually require the coolest air due to the number of windows facilitating heat build up in the cockpit.

During non-worst case conditions the pressure drop across the trim valves is still being maintained equal to the constant pressure value. Therefore in trim valves that are only opened a small amount, the velocity of the air through the valve will start to approach sonic creating a considerable amount of noise. This noise is noticeable to the passengers within the cabin of the aircraft, and if it can be reduced will make an aircraft cabin a more pleasant environment.

One way to reduce the noise generated by the trim valves is to place a muffler downstream of the trim valves. However, this solution is not attractive since it increases the overall system weight and cost.

DISCLOSURE OF THE INVENTION

An object of the present invention is to provide a system which reduces the audio noise created by air flowing through the warm air trim valves of an air cycle air conditioning system.

According to the present invention, the audio noise created by warm air flowing through a plurality of warm air trim valves of an air cycle air conditioning system that controls the temperature within a plurality of zones within an enclosure is reduced by a controller responsive to a plurality of position feedback signals from the plurality of warm air trim valves, the controller schedules the pressure drop across the plurality of warm air trim valves and controls the area of a proportional valve through which warm air flows to achieve the scheduled pressure drop; reducing the area of the proportional valve reduces the pressure drop across the plurality of warm air trim valves thereby reducing the audio noise created by the flow of warm air through the plurality of warm air trim valves, where the variable area through which air flows in each of the plurality of warm air trim valves is under the control of the controller in response to the temperature in the plurality of zones.

By controlling the area of the proportional valve to achieve a scheduled pressure drop across the trim valves, the audio noise created by the trim valves is reduced thereby reducing the noise in an aircraft cabin and creating a more comfortable surrounding for passengers. The pressure drop across the proportional valve can be regulated for various system conditions to reduce the noise created by the trim valves, while satisfying the required flow demands and temperature control requirements in all conditions.

These and other objects, features and advantages of the present invention will become more apparent in light of the following detailed description of a best mode embodiment thereof as illustrated in the accompanying drawing.

BEST MODE FOR CARRYING OUT THE INVENTION

Figure 1:
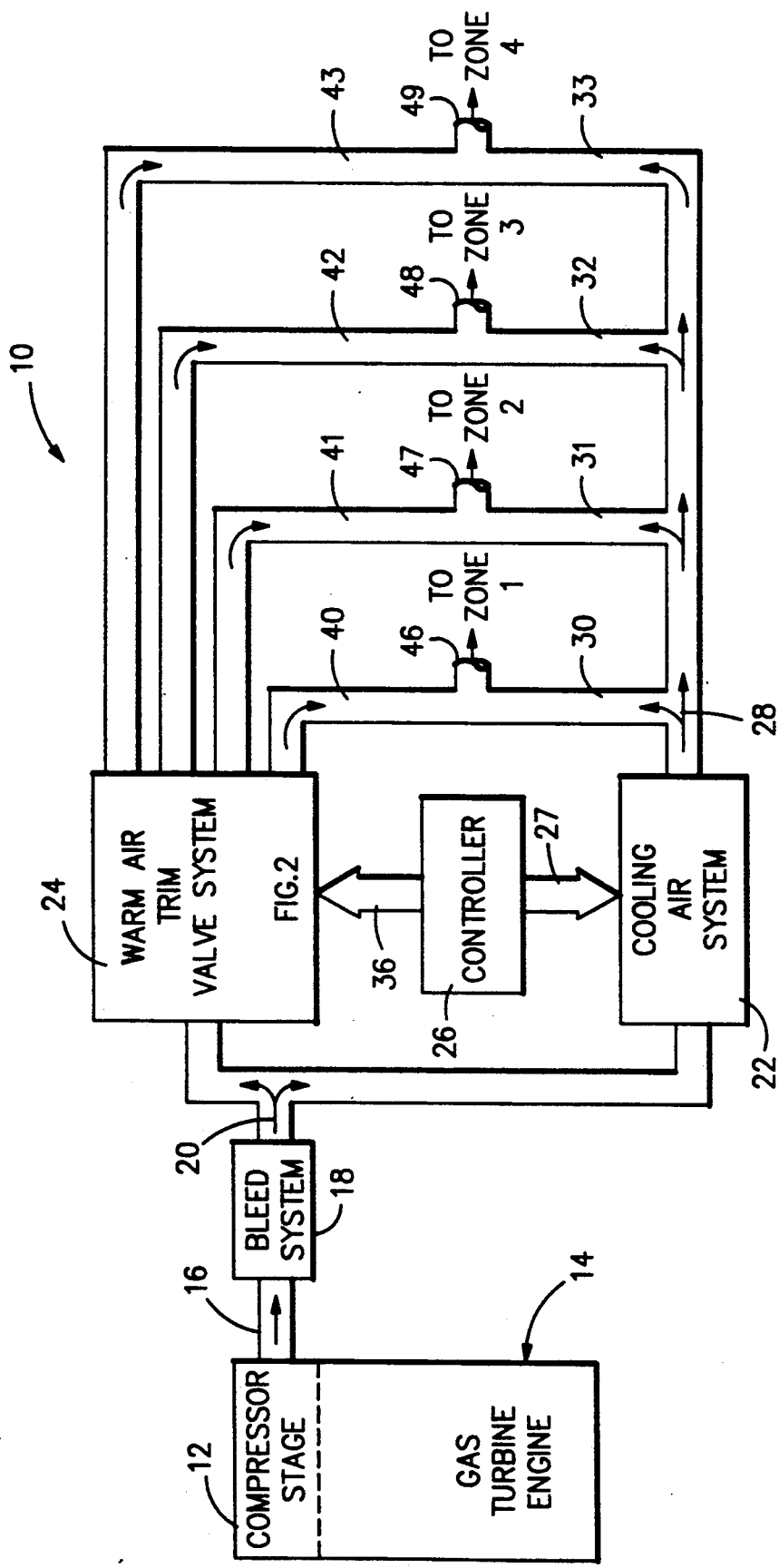
FIG. 1 is a block diagram illustration of a prior art air cycle air conditioning system.

Referring to FIG. 1 a prior art air cycle air conditioning system 10 is illustrated which controls the temperature of the air in an aircraft (not shown). Pressurized air is bled off a compressor stage 12 of an aircraft gas turbine engine 14 and into a bleed pipe 16. The bleed pipe 16 routes the pressurized air to a bleed system 18 which regulates the temperature and pressure of the air in a bleed system outlet pipe 20. The outlet pipe 20 provides air to both a cooling air system 22 which typically cools the bleed air to a reference temperature of approximately 450 degrees Fahrenheit, and to a warm air trim valve system 24.

The aircraft is typically divided up into several zones which may include the cockpit and one or more zones in the main cabin area. In FIG. 1 is illustrated a system consisting of four zones. A controller 26 controls via a plurality of lines 27 the temperature of the air exiting the cooling system 22 into an outlet pipe 28 as a function of the temperature in the warmest zone. The air in the outlet pipe 28 is split into four separate pipes 30-33, each of which corresponds to a separate zone. Since the temperature of the cool air in the outlet pipe 28 is a function of the warmest zone, warm air must be mixed with the cool air in the pipes 30-33 in order to meet the demands of the other zones which require air at a warmer temperature than the reference temperature.

The controller 26 determines how much warm air to mix with the cool air for each zone and commands the warm air trim valve system 24 via a plurality of lines 36 to add the appropriate amount of warm air trim to all but the warmest zone. The warm air for each zone is carried in four trim pipes 40-43 which connect to pipes 30-33. The result is to provide an individually controlled air flow via four outlets 46-49; one for each zone.

Figure 2:
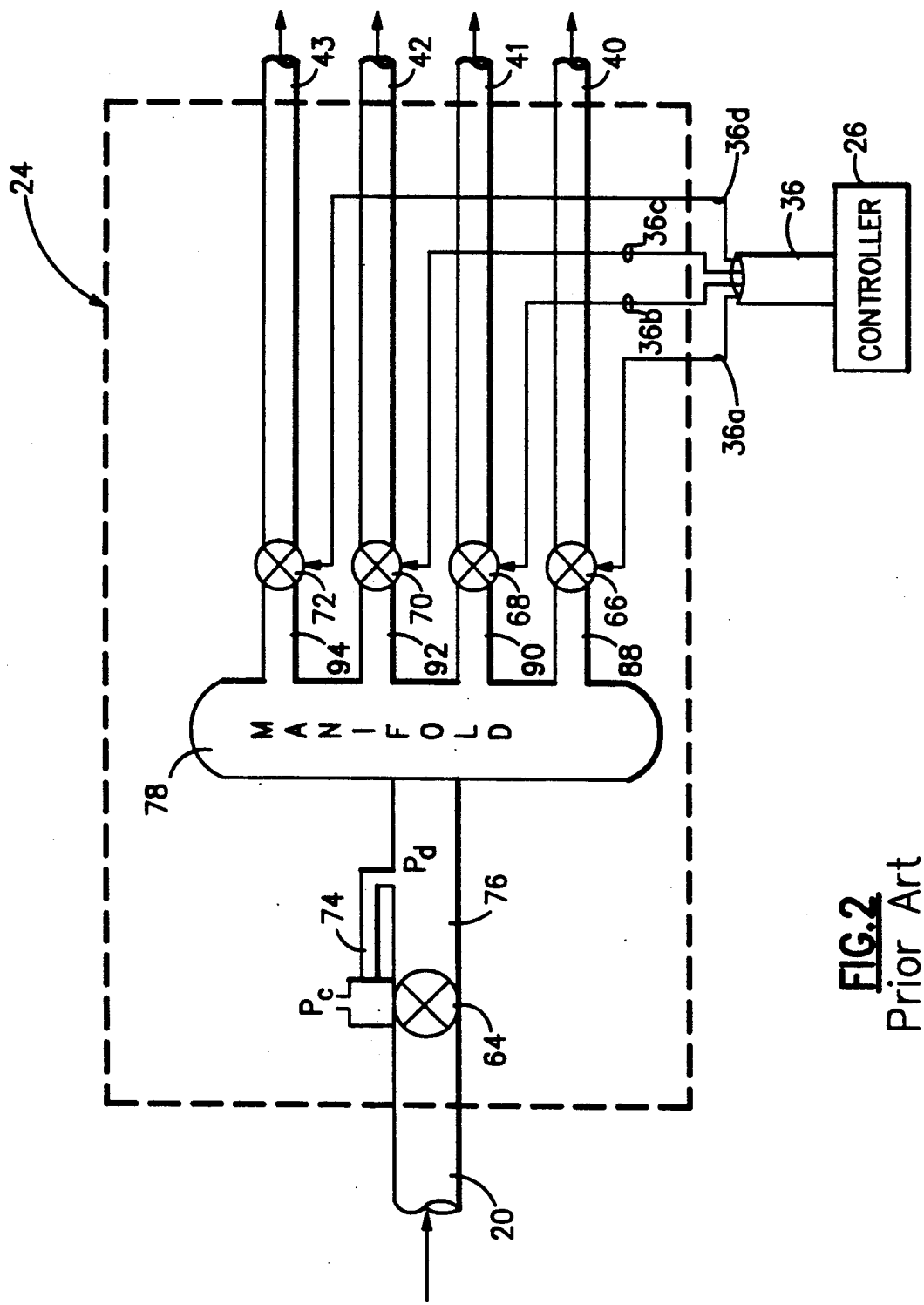
FIG. 2 is an illustration of a portion of the prior art air cycle air conditioning system of FIG. 1.

Referring to FIG. 2 the prior art warm air trim valve system 24 is illustrated which receives warm pressurized air via the bleed system outlet pipe 20. The outlet pipe 20 is connected to a pneumatic pressure regulating valve 64 (e.g., a 3 inch diameter butterfly valve) which maintains a constant pressure drop across a plurality of trim valves 66-72 when the trim valves 66-72 are not closed. The regulating valve 64 senses the pressure, $P_d$, upstream of the trim valves via a non-flowing line 74, and senses ambient pressure which in this case is equal to the cabin pressure, $P_c$. Referring to FIG. 1, the cabin pressure, $P_c$, is the pressure at the four outlets 46-49.

The pressure regulating valve 64 controls the area inside itself through which the air passes in order to maintain the constant pressure drop, $P_d-P_c$, across the trim valves. When the pressure drop decreases below a reference value the regulating valve 64 will increase the air flow by increasing the valve area through which the air flows. Conversely, if the pressure drop increases above the reference value the valve 64 will decrease the air flow by decreasing its area through which the air flows. As discussed hereinbefore the reference value is selected to ensure the system 24 can meet the worst case air flow requirements.

The air exiting the pressure regulating valve 64 enters a manifold pipe 76 which leads to a manifold 78. Air from the manifold 78 enters a plurality of manifold output pipes 88-94, each of which is input to one of the trim valves 66-72. The manifold 78 acts like a filter to remove small pressure perturbations in the manifold pipe 76 from being seen in the four trim pipes 40-43.

As is know each trim valve 66-72 receives a command signal on a corresponding one of the plurality of command lines 36a-36d from the controller 26. The command signals control the amount each trim valve is open (i.e., the variable flow area of each valve). When a particular trim valve is full open, maximum air flow is exiting that trim valve at a relatively slow velocity while the pressure regulating valve 64 maintains the constant pressure drop across the trim valve and the down stream system. As the trim valve area decreases to reduce the temperature in its associated zone, the velocity of the air through the valve starts to increase since the pressure drop remains constant. The velocity increase results in an increase in the magnitude of audio noise being generated by the air rushing through the valve.

The problem with the prior art is that the pressure drop across the trim valves is held at a constant value which corresponds to the value necessary to meet the flow demands during worst case conditions, regardless of the positions of the trim valves. However, by scheduling the pressure drop across the trim valves 66-72 as a function of the positions of the trim valves in accordance with the present invention, the system temperature control requirements can still be met under all conditions while reducing the audio noise created by the air rushing through the trim valves.

Figure 3:
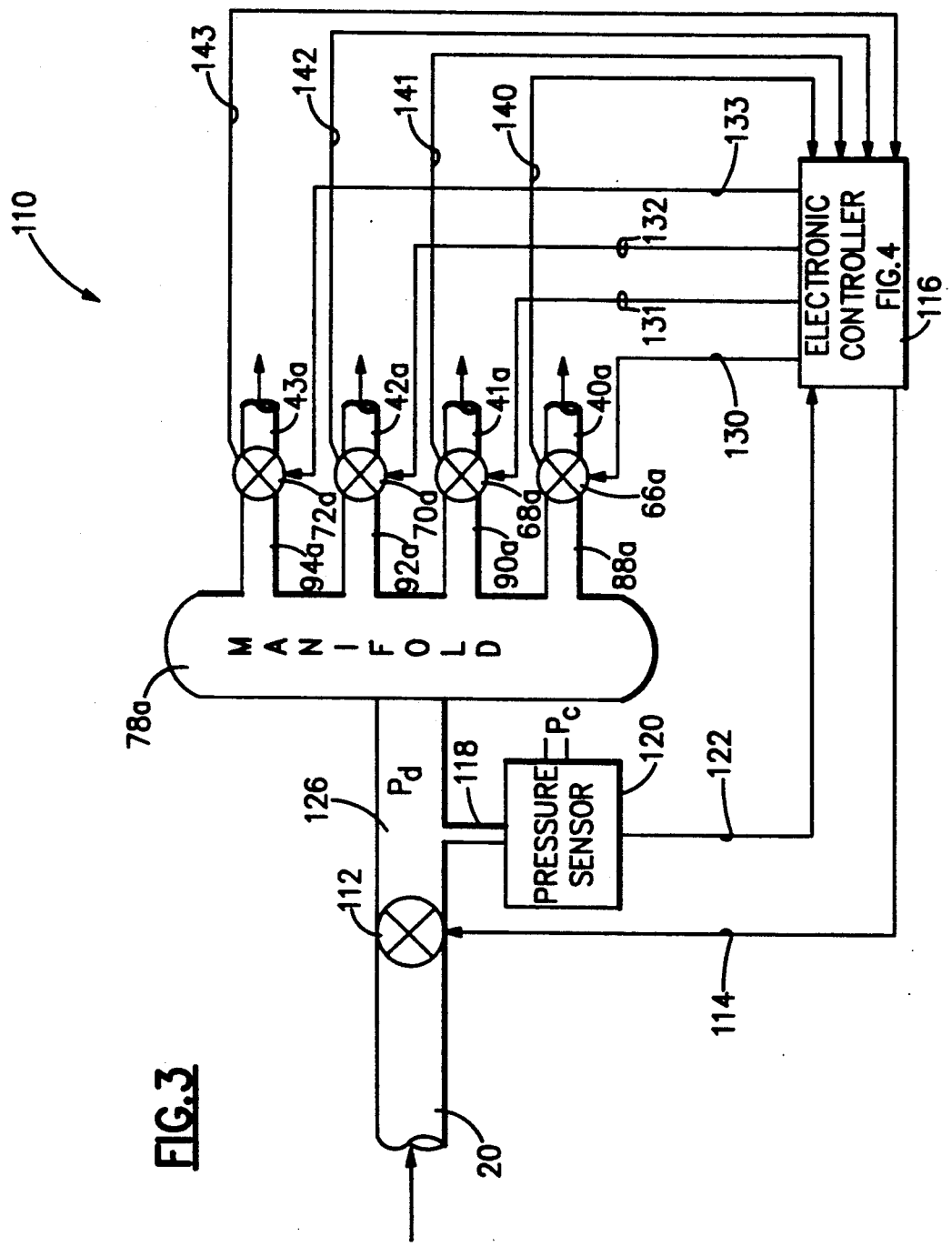
FIG. 3 is a block diagram illustration of an improved warm air trim valve system according to the invention.

Referring to FIG. 3, an improved warm air trim valve system 110 is supplied with warm compressed air by the bleed system outlet pipe 20 which routes the air flow to a proportional valve 112. The area of the proportional valve 112 is controlled by a signal on a line 114 from an electronic controller 116. A non-flowing pipe 118 provides a sense line to a pressure sensor 120 vented to ambient pressure, $P_c$. The pressure sensor 120 provides a signal on a line 122 to the electronic controller 116 indicative of the pressure drop, $P_d-P_c$, across trim valves 66a-72a. Air from the proportional valve 112 enters a manifold inlet pipe 126 which leads to a manifold 78a, from which a plurality of manifold outflow pipes 88a-94a exit. The outflow pipes 88a-94a are connected to the trim valves 66a-72a respectively.

The trim valves 66a-72a are under the control of a plurality of command signals 130-133 from the electronic controller 116, and provide a warm air flow to four trim pipes 40a-43a. The command signals control the amount each trim valve 66a-72a is open. Each trim valve provides a position feedback signal indicative of its position (i.e., how far open each trim valve is) on lines 140-143.

Figure 4:
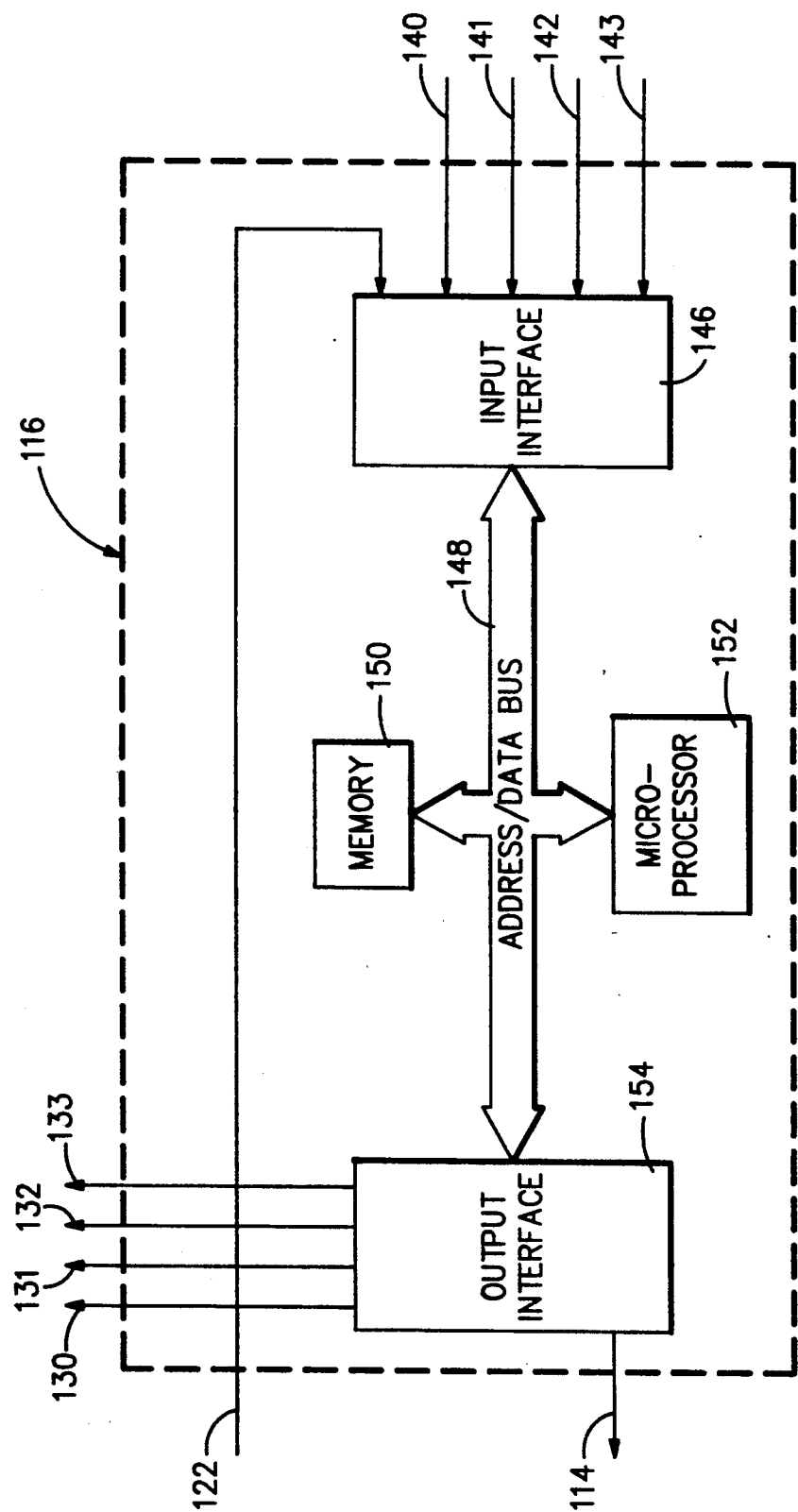
FIG. 4 is block diagram of a portion of an electronic controller contained in the system of FIG. 3.

A top-level block diagram for the electronic controller is illustrated in FIG. 4. The trim valve position feedback signals on lines 140-143 and the pressure signal on the line 122 are input to an input interface 146. The input interface 146 conditions these signals, converts them to digital, and provides digital data indicative of each onto an address/data bus 148 for either storage in memory 150 or for immediate processing by a microprocessor 152. The microprocessor 152 (e.g., Intel model 80286, Motorola model 68020) executes instructions stored in the memory 150 and outputs commands to an output interface 154. The output interface 154 receives digital commands from the microprocessor 152 and converts them to analog commands. The analog commands include the command to the proportional valve 112 on line 114 as well as the commands to the four trim valves 66a-72a on lines 130—133.

Figure 5:
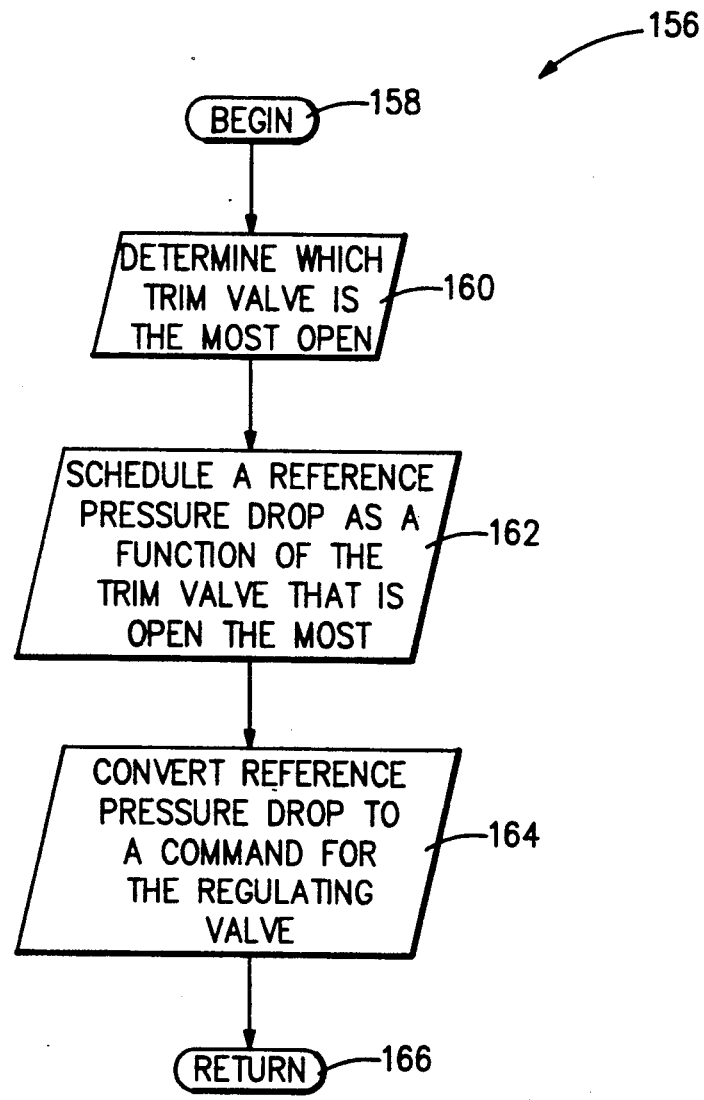
FIG. 5 is a flowchart of the logic used for controlling the improved warm air trim valve system of FIG. 3.

In FIG. 5 is illustrated a routine 156 for software resident in memory 150 and executed by the microprocessor 152 in implementing the present invention. Upon entering at a step 158, a subroutine 160 compares the trim valve feedback signals on lines 140-143 to select which valve is the most open and provides information indicative thereof to a subroutine 162 which schedules a reference pressure as a function of the position of the trim valve that is open the most. The reference pressure value is then converted to a command value for the proportional valve 112 by a subroutine 164. The signal on the line 114 is indicative of the command value for the proportional valve. The routine then exits in a step 166.

Figure 6:
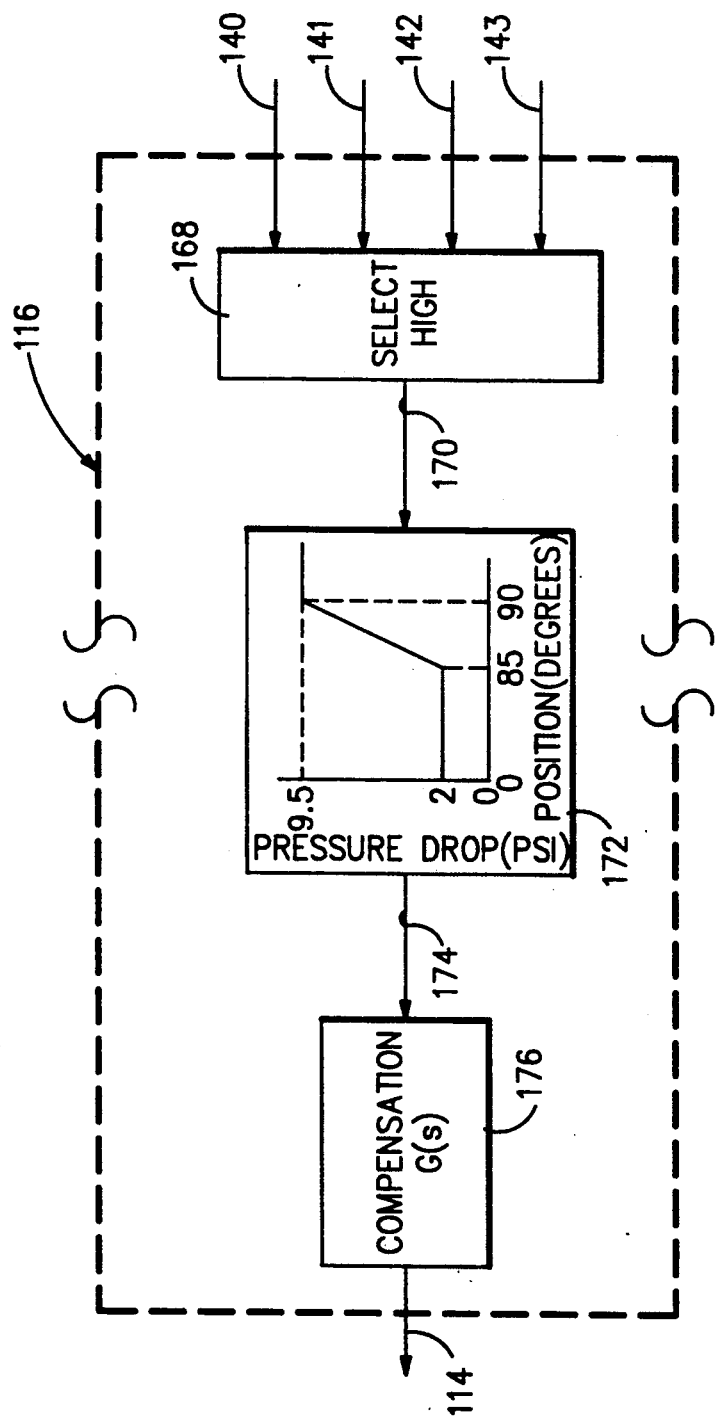
FIG. 6 is a block diagram of a hardware alternative to logic of FIG. 5.

It is not necessary that the logic of FIG. 5 be performed in software; rather it should be understood the logic may instead be performed in hardware as illustrated in FIG. 6. The control logic of FIG. 6 compares the four feedback signals on the lines 140-143 using a select high (S/H) 168 and outputs a signal on a line 170 indicative of the position of the trim valve that is open the most, i.e., the largest of the values on the lines 140-143. Scheduling logic 172 then determines the reference pressure drop $P_d$-$P_c$ based upon the signal on the line 170. A signal indicative of the reference pressure drop is output on a line 174 to a compensator, G(s), 176 that converts the reference pressure drop in units of psi into a position command for the proportional valve 112. The electronic controller 116 commands the position for the proportional valve on the line 114 so the reference pressure drop occurs across each of the trim valves 66a-72a currently open.

The object of the present invention may be best understood by an example of the improved system operation. Assume the improved system 110 (FIG. 3) is in steady state operation, that is the temperature in all zones are equal to their respective reference temperature and have been that way for several minutes now. Further assume the trim valve 66a associated with zone 1 is the most open and the temperature in zone 1 starts to decrease. In response to the temperature decrease, trim valve 66a increases the area which it is open to increase the amount of hot air which is mixed with the cool air from the cooling air system 22. The increase in the area of trim valve 66a causes warmer air to be introduced into zone 1. Since trim valve 66a of zone 1 was open farther than the other trim valves 68-72 prior to the temperature decrease and has since opened even further without any of the other trim valves 68-72 changing position, the value selected by the routine 160 will increase. Depending upon the characteristics of the scheduling function in routine 162, the requested pressure drop from the routine 162 may increase.

If the requested pressure drop is increased a new signal is placed on the line 114 to command an increase in the area which the proportional valve 112 is open. Conversely if the temperature in zone 1 increases instead of decreasing while the position of trim valve 66a is being selected by the subroutine 160, then the reference pressure selected by the subroutine 162 may decrease depending on the characteristics of the scheduling function as determined for a particular application. As an example position signal on the line 170 equals 87.5 degrees and decreases to 84 degrees, the scheduled pressure drop will decrease from 5.75 psi to 2 psi. If the requested pressure drop is decreased, the signal on the line 114 is altered to command a decrease in the area the proportional valve 112 is open, thereby reducing the pressure drop across the trim valves 66a-72a and thus reducing the audio noise created by the air flowing through the trim valves.

Attention is drawn to the fact that the scheduling subroutine 162 of FIG. 5 contains a function similar to the scheduling logic 172 of FIG. 6 which schedules the pressure drop across the trim valves 66a-72a from 2.0 psi to 9.5 psi, based upon the position of the most open trim valve. This is in contrast to the prior art which maintained a constant 9.5 psi pressure drop across the trim valves 66-72. Scheduling the pressure drop still allows the improved system 110 to meet the temperature response requirements in all conditions, since a pressure drop of 9.5 psi will be scheduled when the most open of the trim valves approaches the full open condition.

The characteristics of the function contained in scheduling subroutine 162 or in the scheduling logic 172 of the hardware embodiment are representative only and are chosen based upon the dynamics of the particular system.

Figure 7:
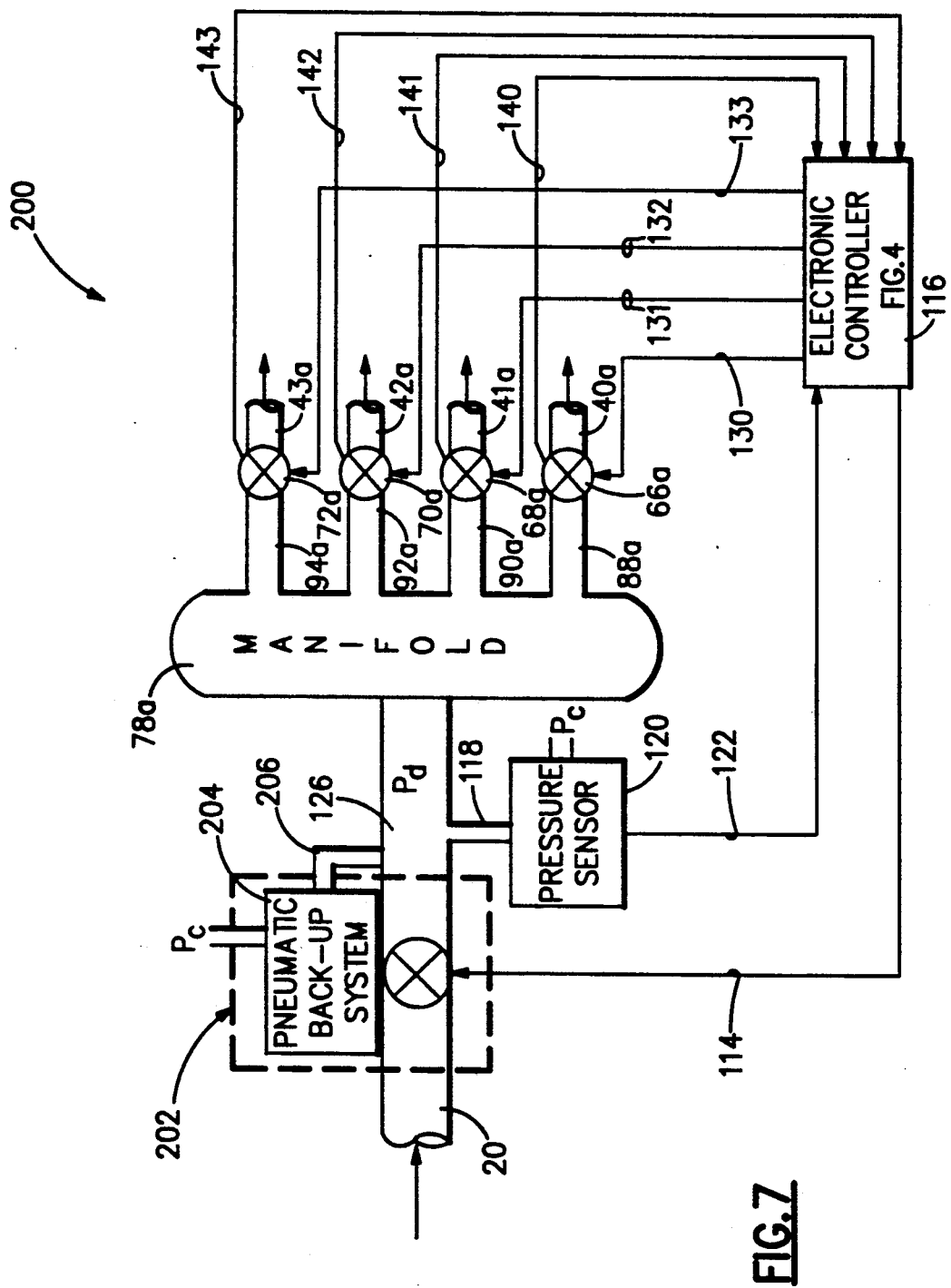
FIG. 7 is a block diagram of an alternative embodiment of the present invention incorporating a pneumatic back-up system to increase the fault tolerance of the warm air trim valve system.

In FIG. 7 is illustrated an improved system alternative embodiment 200 with increased resilience to failures in comparison to the improved system 110 of FIG. 3. An alternative proportional valve 202 is designed to incorporate a pneumatic back-up system 204 which is activated in the event of a failure preventing the electronic controller 116 from accurately controlling valve area of the alternative proportional valve. Similar to the prior art regulating valve 64, the pneumatic back-up system 204 senses $P_d$ via a non-flowing tap line 206 and modulates the valve area to maintain $P_d$ at a reference value. This valve design has the advantage of allowing the electronic controller 116 to modulate the area of the alternative proportional valve 202 in the aforementioned manner similar to the proportional valve 112, thereby reducing audio noise produced by the trim valves 66a-72a, while having a pneumatic back-up system 204 available. Note, when back-up system of the improved proportional valve is active and controlling the area of the valve, the signal on the line 114 no longer controls the valve area due to the failure. Provisions may also be designed into the alternative proportional valve 202 to allow the electronic controller to test the pneumatic back-up system is operating properly; this prevents a failure in the back-up system from going undetected until the back-up system is activated.

It should be understood that the scope of this invention is not limited to the specific arrangement illustrated in FIG. 3. Rather there may be less than four zones or more than four zones. Also it is not necessary that an electronic controller be used in the system. A mechanical controller may be utilized to handle the control functions and schedule the position of the proportional valve based upon the state of the trim valves. Also the manifold may not be necessary if the air flow into the inlet pipe is stable enough such that the attenuation of pressure fluctuations provided by the manifold is not necessary for a particular application.

All the foregoing changes and variations are irrelevant to the invention, it suffices the audio noise created by warm air flowing through a plurality of warm air trim valves is reduced by a controller responsive to a plurality of position feedback signals from the plurality of warm air trim valves. The controller schedules the pressure drop across the plurality of warm air trim valves and controls the area of a proportional valve through which warm air flows to achieve the scheduled pressure drop. Reducing the area of the proportional valve reduces the pressure drop across the plurality of warm air trim valves thereby reducing the audio noise created by the flow of warm air through the plurality of warm air trim valves.

Although the present invention has been shown and described with respect to an exemplary embodiment thereof, it should be understood by those skilled in the art that the foregoing and various other changes, omissions and additions to the form and detail thereof, may be made therein without departing from the spirit and scope of the invention.

I claim:

1. An air cycle air conditioning system for providing conditioned air to a plurality of zones in a vehicle cabin, the temperature of each of the plurality of zones is individually controlled by mixing cool air from a central source with warm trim air, creating a plurality of conditioned air flows, with each zone receiving one of the plurality of conditioned air flows, the system comprising:

pressure sensing means, for sensing pressure in a first pipe, and for providing a pressure signal indicative thereof;

controller means, responsive to said pressure signal and a plurality of position feedback signals, for providing a regulating valve area command signal, and for providing a plurality of trim valve area command signals;

regulating valve means, responsive to said regulating valve area command signal, for receiving warm pressurized air from an inlet pipe, for controlling the flow rate of said warm pressurized air by modulating the area through which said warm pressurized air passes, and for providing a regulated flow of warm air into said first pipe; and a plurality of trim valves, each of said trim valves receiving a portion of said regulated flow of warm air, each of said trim valves having a variable area through which said portion of said regulated flow of warm air enters at a trim valve inlet and exits at a trim valve outlet, each of said trim valves being responsive to a corresponding one of said plurality of trim valve area command signals in varying the area thereof, said plurality of position feedback signals being indicative of the area that each of said trim valves is open, each of said trim valves providing a warm air flow into a corresponding one of said outlets, whereby each of said warm air flows is mixed with the cool air from the central source to create the plurality of conditioned air flows which enter the plurality of zones.

2. The system of claim 1, wherein said controller means further comprises means for scheduling said regulating valve area command signal to provide a certain pressure drop across said plurality of trim valves in response to said plurality of position feedback signals.

3. The system of claim 1, wherein said controller means comprises a microprocessor.

4. The system of claim 1, wherein said regulating valve means further comprises pneumatic back-up control means for controlling the area of said regulating valve means through which said warm air passes, in the event of a failure preventing said controller means from controlling the area via said regulating valve area command signal.

5. The system of claim 1, further comprising:
   a manifold, positioned to receive said regulated flow of warm air from said first pipe, and to provide each of said plurality of trim valves with their said portion of said regulated flow of warm air.

6. An apparatus for providing pressurized air to an enclosure, comprising:

pressure sensing means, for sensing air pressure in a first pipe, and for providing a pressure signal indicative thereof;

controller means, responsive to said pressure signal and to a plurality of position feedback signals, for providing a regulating valve area command signal, and for providing a plurality of trim valve area command signals;

regulating valve means, responsive to said regulating valve area command signal, for receiving pressurized air, for modulating the area through which said pressurized air flows, and for providing a regulated flow of air into said first pipe; and a plurality of trim valves, each of said trim valves receiving a portion of said regulated flow of air, each of said trim valves having a variable area through which flows said portion of said regulated flow of air, said variable area of each of said trim valves being responsive to a corresponding one of said plurality of trim valve area command signals, said plurality of position feedback signals being indicative of the amount of said variable area each of said trim valves is open, such that the area of said regulating valve means is controlled by said controller means as a function of said plurality of position feedback signals to reduce the audio noise created by the air flowing through said plurality of trim valves and into the plurality of zones.

7. The system of claim 6, wherein said controller means further comprises means for scheduling said regulating valve area command signal to provide a certain pressure drop across said plurality of trim valves in response to said plurality of position feedback signals.

8. The system of claim 6, wherein said controller means comprises a microprocessor.

9. The system of claim 6, wherein said regulating valve means further comprises pneumatic back-up control means for controlling the area of said regulating valve means through which said air passes, in the event of a failure preventing said controller means from controlling the area via said regulating valve area command signal.

10. The system of claim 6, further comprising:
    a manifold, positioned to receive said regulated flow of air from said first pipe, and to provide each of said plurality of trim valves with their said portion of said regulated flow of air.

* * * * *